United States Patent [19]

Piot et al.

[11] Patent Number: 4,847,702
[45] Date of Patent: Jul. 11, 1989

[54] METHOD AND APPARATUS FOR CONVERTING A BINARY SIGNAL

[75] Inventors: Julien Piot, Cambridge, Mass.; Marcel Schneider, Dietikon; Thomas Saner, Zürich, both of Switzerland

[73] Assignee: Willi Studer AG, Regensdorf, Switzerland

[21] Appl. No.: 58,335

[22] Filed: Jun. 4, 1987

[30] Foreign Application Priority Data

Jun. 12, 1986 [CH] Switzerland .................. 02384/86

[51] Int. Cl.$^4$ .............................................. G11B 5/09
[52] U.S. Cl. ........................................ 360/40; 360/41
[58] Field of Search ............... 360/40, 41, 51; 375/21, 375/37

[56] References Cited

U.S. PATENT DOCUMENTS

| | | | |
|---|---|---|---|
| 2,954,267 | 9/1960 | Canepa | 360/40 |
| 3,108,265 | 10/1963 | Moe | 360/40 |
| 3,852,809 | 12/1974 | Coker, Jr. | |
| 4,525,753 | 6/1985 | Shimeki et al. | |
| 4,562,491 | 12/1985 | Kawabata et al. | |

OTHER PUBLICATIONS

IBM Technical Disclosure Bulletin, vol. 26, No. 5, Oct. 1983, pp. 2545 to 2547; publication by N. R. Davie et al, entitled "Binary Linear Write Equalization".
Patents Abstracts of Japan, vol. 9, No. 195, Aug. 13, 1985 concerning Japanese Patent Publication No. 60-61904, published Apr. 9, 1985.
IEEE Transactions on Computers, vol. C-17, No. 9, Sep. 1968, pp. 827 to 845; publication by T. H. Chen, entitled "The Use of Delay Lines in Reading a Manchest Code".
IBM Technical Disclosure Bulletin, vol. 17, No. 5, Oct. 1974, p. 1483 publication by T. J. Beaulieu et al, entitled "Data Detector With Enchancement Feature".
IBM Technical Disclosure Bulletin, vol. 24, No. 11A, Apr. 1982, p. 5348 publication by J. A. Bailey, entitled "NRZI-Double-Pulse Code Conversion".

Primary Examiner—Vincent P. Canney
Attorney, Agent, or Firm—Werner W. Kleeman

[57] ABSTRACT

In order to reduce the current supply and thus the heating up of relevant components during the processing of binary signals of any desired pulse duration or width, the pulses forming the binary or first signal are converted into a pulsed or second signal which forms a pulse sequence or train consisting of short pulses having different polarities. The individual pulses of the binary signal are converted to short pulses having a first spacing in the pulsed or second signal. The transitions between the pulses of the binary or first signal are converted to pulses having any desired shortened second spacing as compared to the first spacing.

12 Claims, 4 Drawing Sheets

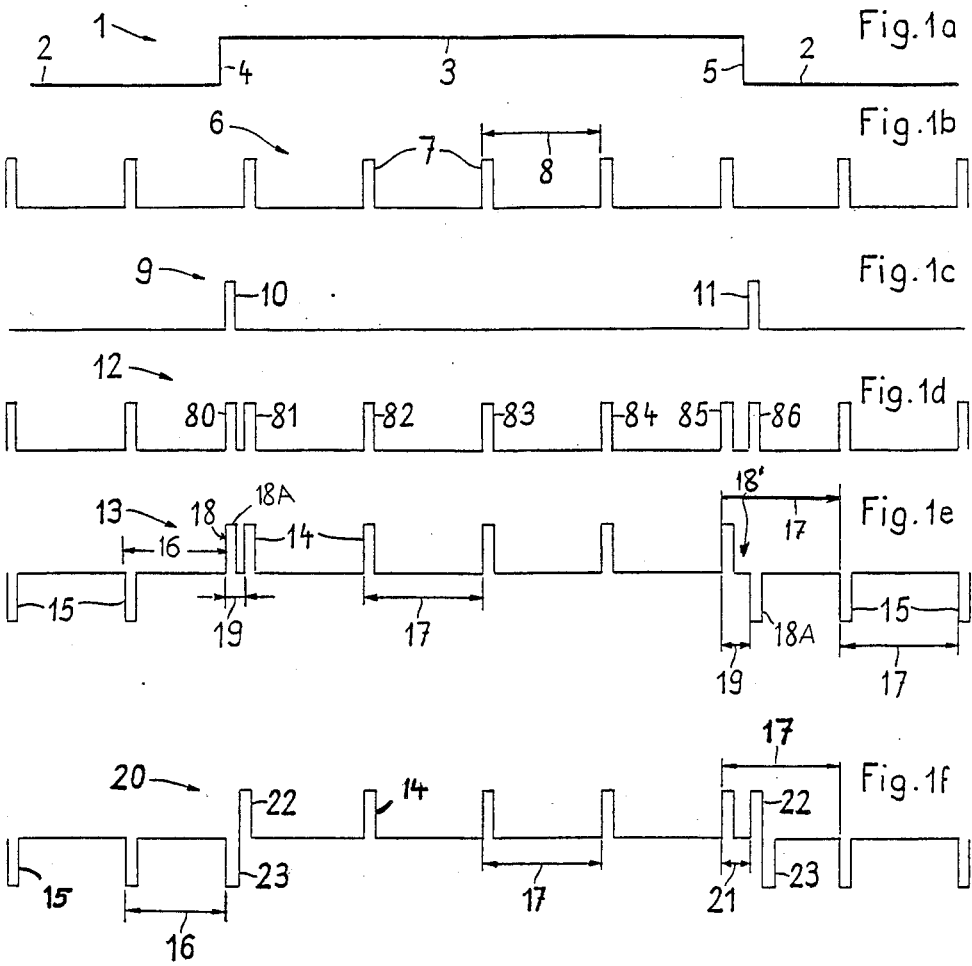
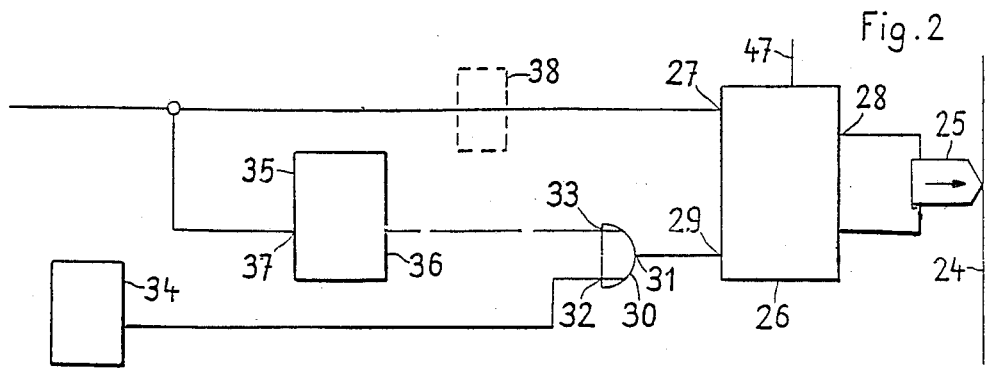

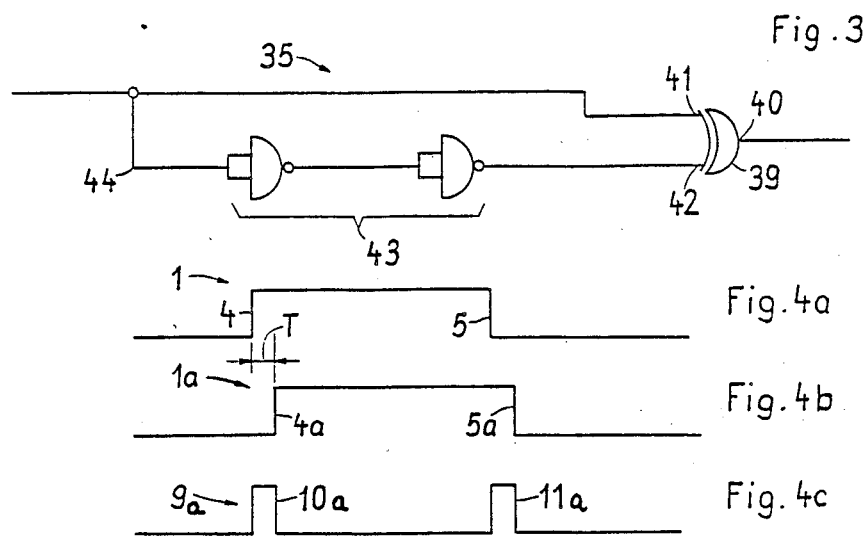
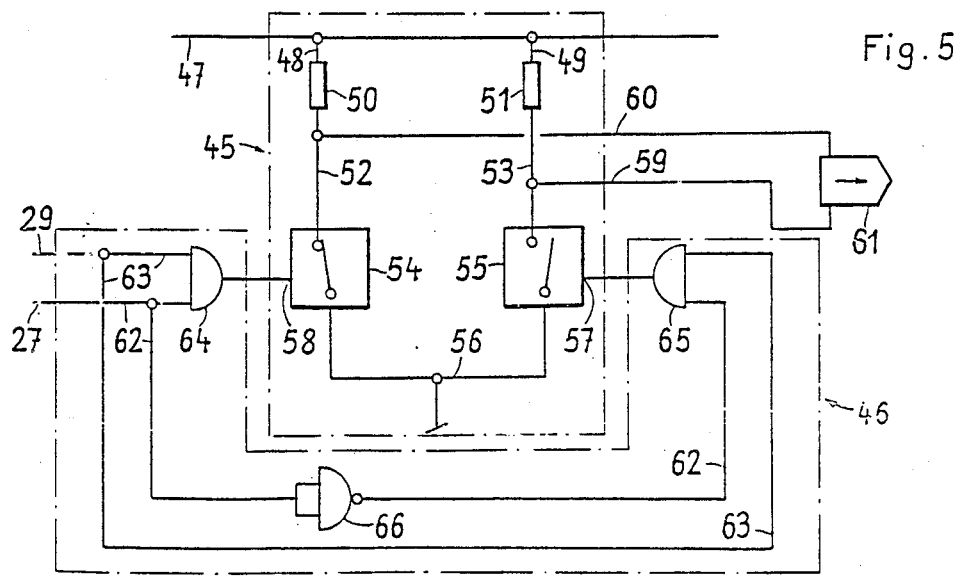

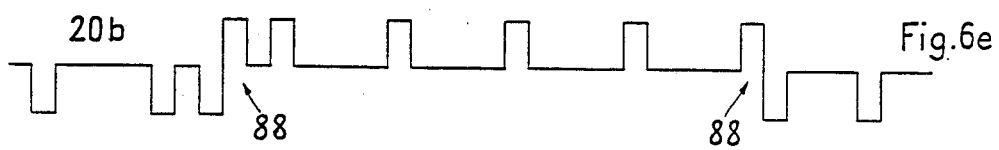
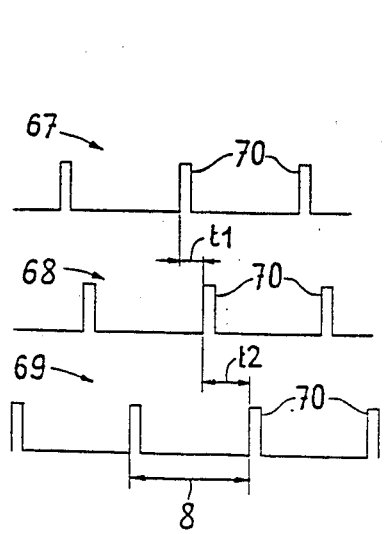
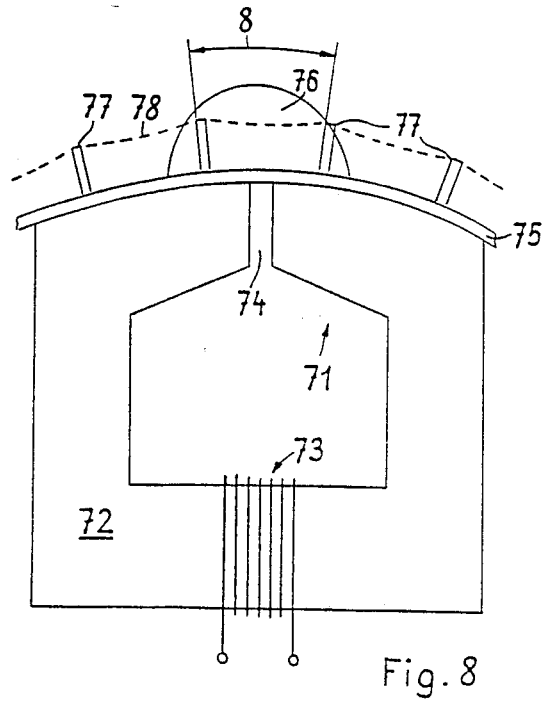

METHOD AND APPARATUS FOR CONVERTING A BINARY SIGNAL

BACKGROUND OF THE INVENTION

The present invention relates to a new and improved method of, and apparatus for, converting a binary signal.

In its more specific aspects, the present invention particularly relates to a new and improved method of, and apparatus for, converting a binary or first signal which assumes a first state and a second state, into a pulsed or second signal. The method is preferably used for recording binary signals on a magnetic record carrier.

Binary signals are widely used in the field of electrical signal processing. Signals in the form of modulated binary signals are known and such signals contain pulses of substantially equal length or time duration and which pulses follow each other at different spacings or intervals. Other modulated binary signals possess pulses whose length or time duration is not constant. With respect to the last mentioned signals it is important to recognize the beginning and the end of the pulse, that is, the edges or flanks of each pulse. During the digital recording of such signal on a magnetic tape, there are thus recorded pulses by supplying a corresponding writing current to a recording head. In this manner, the polarity of the magnetization on the magnetic tape is changed along the length of the magnetic tape such that an image or copy of the current pulses supplied to the recording head is formed. A region on the magnetic tape having a specific length and a magnetization of a particular polarity, corresponds to a pulse having a specific length or duration. Another region on the magnetic tape having a specific length and a magnetization of a different polarity, corresponds to a pulse which is not present, that is, an interpause or section between two consecutive pulses. Therefore, the edges or flanks of the pulses effect a change between the polarities on the magnetic tape. In the recording head, this means that the writing current for the pulses once flows in one direction and then in the other direction. On the average, when considered over a longer time period, there thus flows a specific current in the recording head and this current flow also causes heating-up of the recording head.

It is one disadvantage of this known construction that, when processing such binary signals in, for example, recording heads provided for a plurality of tracks on the magnetic tape, the writing currents associated with all of the tracks conjointly heat up the recording heads. This stronger heating action reduces the working or operating life of such recording heads or components. The writing current, however, also produces a power loss or dissipation in the writing head electronics with which the recording head is series connected.

In a method and an apparatus such as known, for example, from U.S. Pat. No. 4,562,491, granted Dec. 31, 1985, signals are processed for recording in a plurality of tracks on a magnetic record carrier. This is effected by converting the individual pulses of an input signal into a variable number of very short pulses. Two polarities are provided for the short pulses. Short pulses in the recorded signal are associated with the edges or flanks of the pulses of the input signal and the short pulses are offset from each other when they are recorded on adjacent tracks of the magnetic record carrier.

It is one disadvantage of this method that there are permitted to be processed for recording only those input signals whose edges occur at particular previously-known positions or whose pulse lengths or durations have only certain discrete values. This means that there exists a predetermined raster in which these pulse edges can occur and in which the short pulses derived from these pulse edges can be positioned. Consequently, also the short pulses may possess only predetermined mutual spacings. The processing of input signals which are modulated with respect to their pulse length or duration, is impossible in this known way. Only specific binary signals can be so processed for recording.

SUMMARY OF THE INVENTION

Therefore, with the foregoing in mind, it is a primary object of the present invention to provide a new and improved method of, and apparatus for, converting a binary signal and which method and apparatus are not afflicted with the aforementioned drawbacks and shortcomings of the prior art constructions.

Another important object of the present invention aims at the provision of an improved method of, and apparatus for, converting a binary signal and which method and apparatus permit processing any desired binary signal and reducing the heating-up of components to which such binary signals are supplied.

Now in order to implement these and still further objects of the invention which will become more readily apparent as the description proceeds, the method and apparatus of the present development are manifested by the features that, any desired binary signal which is supplied, for example, to elements for recording, is first converted into a different signal possessing different properties. There thus result the desired advantages of reduced heating-up of components and reduced power dissipation. In addition, the new different signal which is used, for example, for recording can be suitably shaped in a manner such that, after recording on magnetic tape, a signal exists which corresponds to the original binary signal. No additional measures are thus necessary for improving this signal during playback from the magnetic tape. The inventive method and apparatus are particularly suitable for recording pulse delta modulated and pulse duration modulated signals.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein:

FIGS. 1a to 1f are waveform diagrams of various signals which are processed according to a first exemplary embodiment of the inventive method and which are partially dependent upon each other;

FIG. 2 is a block diagram of a first exemplary embodiment of the inventive apparatus for processing the signals shown in FIGS. 1a to 1f;

FIG. 3 is a block circuit diagram of a part of the apparatus shown in FIG. 2;

FIGS. 4a to 4c are waveform diagrams of different signals appearing in the part of the apparatus shown in FIG. 3;

FIG. 5 is a block circuit diagram of a further part of the apparatus shown in FIG. 2;

FIGS. 6a to 6e are waveform diagrams of various signals which are processed according to a second exemplary embodiment of the inventive method and which are partially dependent upon each other;

FIG. 7 shows waveform diagrams of mutually offset signals produced by the inventive method;

FIG. 8 is a schematic illustration of a recording head together with the waveform of a signal produced according to the inventive method.

DETAILED DESCRIPTION OF THE PREFERRED EMBODIMENTS

Figure 9A:
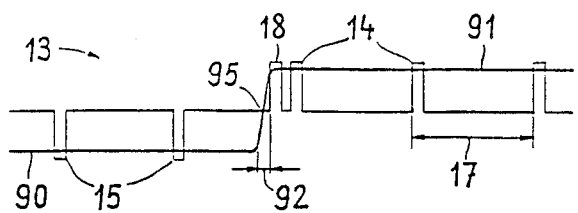
FIGS. 9a and 9b schematically illustrate the magnetization produced on a magnetic record carrier by the signals obtained by the inventive method.

Describing now the drawings, it is to be understood that only enough of the construction of the inventive apparatus and the processed signals have been shown as needed for those skilled in the art to readily understand the underlying principles and concepts of the present development, while simplifying the showing of the drawings. Turning attention now specifically to FIGS. 1a to 1f of the drawings, there have been illustrated therein by way of example and not limitation, various signals which are processed according to a first exemplary embodiment of the inventive method. The various signals and their interrelationship are discussed hereinbelow.

FIG. 1a shows a binary or first signal 1 which assumes a first state 2 and a second state 3 and these states 2 and 3 are separated from each other by respective edges or flanks 4 and 5. The states 2 and 3 can also be considered as pulses of a specific but arbitrary length.

FIG. 1b shows a clock signal 6 consisting of a train or sequence of pulses 7 possessing substantially the same spatial or temporal spacings 8 from each other.

FIG. 1c shows a pulse train or sequence 9 derived from the binary or first signal 1. Each edge 4 and 5 of the binary or first signal corresponds to a respective pulse 10 and 11 in the pulse train or sequence 9 and the pulses 10 and 11 occur upon transitions between the states 2 and 3 of the binary or first signal.

FIG. 1d shows a control signal 12 composed of or combined from the clock signal 6 and the pulse train or sequence 9.

FIG. 1e shows a pulsed or second signal 13 containing positive short pulses 14 and negative short pulses 15. The pulsed or second signal 13 contains pulse pairs of successive pulses 14 and 15 having different polarities and a first spacing 17, and pulses 18A forming double additional pulse 18 possessing a shortened or second spacings 19 in comparison to the first spacing 17 between the positive pulses 14 or the negative pulses 15. The additional pulses 18A in the double pulses 18 in the pulsed second signal 13 correspond to the edges 4 and 5 in the binary or first signal 1. The first pulse of the double pulses 18 forms with the preceding pulse of opposite polarity a further pulse pair having the shortened spacing 16. The second pulses of each double pulse 18 always possess the polarity of the following pulses 14 or 15, as the case may be. As further illustrated in Figure 1e, the pulsed or second signal 13 also contains double pulses 18' having different polarities. The first pulse of the double pulse 18' forms with the consecutive pulse of opposite polarity a pulse pair having a spacing substantially identical to the spacing 17 between the positive pulses 14 or the negative pulses 15.

FIG. 1f shows, as a further type of the pulsed or second signal, a signal 20 containing additional pulses 22, 23 composed of positive pulses 22 and negative pulses 23 and signal 1. The first pulse of the additional pulses 22, 23 always has the polarity of the preceding pulses. The spacings 16 or 21 of these first pulses of the additional pairs 22, 33 from the respective preceding pulse are shortened in comparison to the first spacing 17 between the pulses 14 or 15. The same applies to the spacing between the second pulse of each additional pulse 22, 23 and the following pulse 14 or 15, as the case may be.

FIG. 2 shows a schematic representation of a first exemplary embodiment of the inventive apparatus. There will be recognized in FIG. 2 a magnetic tape 24, a recording head 25 and an amplifier 26. The amplifier 26 possesses an input 27 for receiving the binary or first signal 1 and an output 28 for outputting the pulsed or second signal 13 or 20, as the case may be. A second input 29 is connected with the output 31 of an OR gate 30. One input 32 of the OR gate 30 is connected with a clock pulse generator 34 and an other input 33 of the OR gate 30 is connected with an output 36 of a pulse generator 35 whose input 37 receives the binary or first signal 1. A delay unit 38 for the binary or first signal 1 can be optionally connected with the input 27 of the amplifier 26. A d.c. current supply line 47 is also connected to the amplifier 26.

FIG. 3 shows an exemplary construction of the pulse generator 35 which essentially contains an exclusive OR gate 39 having an output 40 and two inputs 41 and 42. A delay stage 43 is connected to the input 42. The binary or first signal 1 is applied to the input 44 of the delay stage 43 as well as to the input 41 of the exclusive OR gate 39.

FIG. 4a again shows the binary or first signal 1 containing the edges 4 and 5. This signal 1 is applied to the inputs 41 and 44.

FIG. 4b shows a delayed signal 1a with edges 4a and 5a. This signal 1a is applied to the input 42 of the exclusive OR gate 39.

FIG. 4c shows a pulse train or sequence 9a containing pulses 10a and 11a generally corresponding to the pulse train or sequence 9 shown in FIG. 1c.

FIG. 5 shows a possible construction of the amplifier 26 essentially containing circuit means 45 for controlling the direction of current flow and series connected with a control circuit 46 for actuating the circuit means 45. The circuit means 45 is connected to a d.c. current supply line 47 to which there is applied, as a supply voltage, a d.c. voltage which, for example, can be adjusted in any known manner. Two taps 48 and 49 in the d.c. current supply line 47 are connected with respective resistances 50 and 51 which, in turn, are connected by means of respective lines 52 and 53 with one side of switching elements 54 and 55. The other sides of the switching elements 54 and 55 are connected via a line 56 to ground or any other suitable potential. In addition, the switching elements 54 and 55 possess respective inputs 57 and 58 for receiving a control signal from the control circuit 46. Outputs 59 and 60 of the circuit means 45 are respectively connected with the lines 53 and 52 and serve as terminals for connection to a recording head 61.

The control circuit 46 is connected to the inputs 27 and 29 of the amplifier 26. Lines 62 and 63 connect the amplifier inputs 27 and 29 with respective AND gates 64 and 65 of the control circuit 46. The AND gates 64 and 65 have outputs respectively connected to the inputs 58 and 57 of the switching elements 54 and 55. An inverter 66 is connected in circuit between the gates 64 and 65 in the line or conductor 62 which is connected with the input 27.

FIGS. 6a to 6e show the types of signals processed according to a second exemplary embodiment of the inventive method in a second exemplary embodiment of the inventive apparatus provided with the delay unit 38. FIG. 6a thereof again shows in the known manner the binary or first signal 1 and FIG. 6b shows the delayed signal designated by the reference character 1b. The actual delay T2 in this case is only about half as large as the delay of the signal 1a shown in FIG. 4b.

FIG. 6c shows a pulse train or sequence 9b composed of pulses 10b and 11b.

FIG. 6d shows a control signal 12b combined correspondingly to the control signal 12 from a clock signal and the pulse train or sequence 9b in order to form a control signal 12b.

FIG. 6e shows a pulsed or second signal 20b corresponding to the pulsed or second signal 20 shown in FIG. 1f.

FIG. 7 shows sections from three pulsed or second signals 67, 68 and 69 whose pulses 70 possess a first spacing 8 from each other and each of which signals 67, 68 and 69 is intended, for example, to be recorded on a separate track of a magnetic tape. The pulses 70 of the signal 67, however, are temporally offset by a time period t1 with respect to the pulses 70 of the signal 68. Similarly the pulses 70 of the signals 68 and 69 are offset with respect to each other by a time period t2. By this measure, the crosstalk attenuation between the individual tracks can be increased.

FIG. 8 shows a simplified representation of a recording head 71 containing a core 72 and an exciter winding 73. A magnetic field extends in a known manner across a gap 74. This magnetic field is sufficiently effective to effect the magnetization of a magnetic tape 75 in the known manner in a recording zone 76. Pulses 77 of a pulsed or second signal are drawn in for the purpose of comparison. The manner of representation of these pulses 77 before the gap 74, however, does not correspond to real conditions. The diagram is merely intended to show that the spacing 8 between the pulses 77 is smaller than the extent or dimension of the recording zone 76 in front of the gap 74. This has the result that the magnetization of the magnetic tape 75 does not correspond to the pulses 77 but rather follows a course as represented by the curve 78. This means that the magnetization to a wide extent is effected again in the correspondence to the states 2 and 3 of the binary or first signal 1.

FIG. 9a shows the magnetization produced in a magnetic record carrier when, for example, the pulsed or second signal 13 according to FIG. 1e is recorded on such magnetic record carrier. The negative pulses 15 produce a magnetization having one polarity as indicated by the line 90. The positive pulses 14 produce a magnetization having the other polarity as indicated by the line 91. It should be noted that the magnetization is not changed between the individual positive pulses 14 or negative pulses 15. When the positive pulses 14 or the negative pulses 15 are not too widely spaced, the magnetization is retained between the pulses 14 or 15 and beyond such pulses 14 and 15. The magnetization changes its polarity only when there occurs a double pulse 18 containing the opposite polarity. The magnetization which was caused by the preceding pulses, in the worst case, is retroactively changed only over a very short distance 92 in comparison with the first spacing 17 between the pulses 14 or 15. Therefore, for example, a negative pulse must not necessarily be provided immediately preceding the first positive pulse of a following sequence of first pulses 14.

Figure 9B:
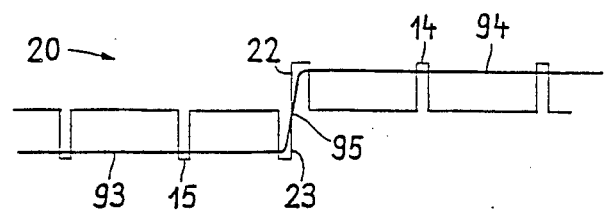

FIG. 9b again shows the pulsed or second signal 20 according to FIG. 1f and containing the additional pulse 22, 23 composed of the immediately consecutive pulses 23 and 22 of opposite polarity. Also, lines 93 and 94 indicate the corresponding magnetization of the magnetic record carrier as a result of the pulses 15 and 14.

For both pulsed or second signals 13 and 20, the transition region of the magnetization which is indicated at 95, is located approximately at the same positions in relation to the pulses 14 and 15.

There will now be explained in more detail the manner of carrying out the inventive method which essentially consists of converting the binary or first signal 1 according to FIG. 1a in a manner such that there is formed a pulsed or second signal 13 or 20 as shown in FIG. 1e or 1f, as the case may be. To this end, the states 2 and 3 of the binary or first signal 1 are converted into a sequence of short pulses 14 and 15 having polarities which are respectively associated with the states 3 and 2 of the binary or first signal 1. During this operation, double pulses 18 with additional pulses 18A having the shortened second spacing 19 to the next-following pulse, are formed in the region of the edges 4 and 5 of the binary or first signal 1. In order to obtain the pulsed or second signal 20 shown in FIG. 1e, for example, further signals of the types as shown in FIGS. 1b, 1c or 1d can be used. This will be explained with reference to the mode of operation of the apparatus shown in FIG. 2.

For use with a magnetic tape recording device, the binary or first signal 1 is applied to the input 27 of the amplifier 26 and the input 37 of the pulse generator 35. This binary or first signal 1 is intended, for example, for a time code track, an auxiliary track or an audio track of the magnetic record carrier like the magnetic tape 24. The pulse generator 35 produces the pulse train or sequence 9, see FIG. 1c, containing the pulses 10 and 11 triggered by the respective edges or flanks 4 and 5. This pulse train or sequence 9 is supplied to the input 33 of the OR gate 30. The clock signal 6, see FIG. 1b, from the clock signal generator 34 is supplied to the input 32 of the OR gate 30.

The OR gate 30 permits all pulses 10, 11 and 7 which are applied to its respective inputs 32 and 33 to appear at its output 31. In this manner, a control signal 12 is generated by the combination of the pulse train or sequence 9 and the clock signal 6. This control signal 12 contains pulses 82, 83, 84 with substantially equal spacings and these pulses 82, 83, 84 are interrupted by pulses or pulse pairs 80, 81 and 85, 86 with comparatively shortened spacings or intervals.

The amplifier 26 operates in a manner such that only in the presence of a pulse at the input 29 the binary or first signal 1, which is present at the input 27, is infed or taken into account. However, the direction of the current appearing at the amplifier output 28, that is, the writing current for the recording head 25, changes depending upon whether the binary or first signal 1 is in the first state 2 or the second state 3. As shown in FIG. 1e, for example, a negative polarity and thus negative pulses 15 of the pulsed or second signal 13 or 20 and, consequently, a related direction of the writing current at the output 28 correspond to the first state 2. Correspondingly, the positive pulses 14 of the pulsed or second signal 13 or 20 and the opposite direction of the writing current are associated with the second state 3.

The mode of operation of the pulse generator 35 will be explained with reference to FIGS. 3 and 4. The binary or first signal 1 as shown in FIG. 4a is applied to the inputs 41 and 44. The delay stage 43 causes the binary or first signal 1 to be delayed by a time period T and there is formed a delayd signal 1a which is supplied to the input 42 of the exclusive OR gate 39. The pulse train or sequence 9a as shown in FIG. 4c is generated at the output 40 of the exclusive OR gate 39.

The mode of operation of the amplifier 26 can be deduced from FIG. 5, at least insofar as this does not concern the known actual amplification of the signal. The following consideration starts from the assumption that a supply voltage is applied to the d.c. current supply line 47, which can be adjusted to produce the desired amplification, the binary or first signal 1 as shown in FIG. 1 is present at the input 27 and the control signal 12 as shown in FIG. 1d is present at the input 29 of the amplifier 26. The binary or first signal 1 and the control signal 12 are combined in the AND gates 64 and 65 and the associated switching elements 54 and 55 are controlled by the thus obtained signals at the respective inputs 57 and 58.

According to the laws governing the operation of an AND gate, a signal is obtained at the input 58 of the switch element 54 and consists of the pulses of the control signal 12 as long as the binary or first signal 1 possesses the second state 3. If the binary or first signal 1 possesses the first state 2, then, no signal is present at the input 58. The binary or first signal 1 is applied to one input of the AND gate 65 through the inverter 66 and the control signal 12 is applied to the other input of the AND gate 65. Therefore, a signal is present at the input 57 of the switching element 55 only as long as the binary or first signal assumes the state 2. Accordingly, during the appearance of the pulses 80 to 85 of the control signal 12, i.e. during the second state 3 of the binary or first signal 1, the switching element 54 conducts and the switching element 55 does not conduct.

The current flows from the d.c. current supply line 47 through the resistances 50 and 51, the lines or conductors 52 and 53, the switching element 54 and the line or conductor 56 to ground. Since the impedance of the recording head 61 is very small in comparison to that of the resistance 50 or 51, a current also flows across the output 59 to the recording head 61.

Starting from the pulse 86 of the control signal 12, the switching element 54 no longer conducts because the binary or first signal 1 now is in the first state 2. However, the switching element 55 conducts when the control signal 12 generates a pulse. A current then flows from the d.c. current supply line 47 through the resistances 50 and 51, the lines or conductors 52 and 53, the switching element 55 and the or line conductor 56 to ground. During this time, a current also flows through the output 60 and the recording head 61. No current flows between the pulses of the control signal 12 since both switching elements 54 and 55 are not conductive during this period.

If a delay circuit 38 is series connected with the amplifier input 27 for receiving the binary or first signal 1 as illustrated in FIG. 2, then the delayed signal 1b, which is delayed by a time period T2 with respect to the binary or first signal 1, see FIG. 6b, is present at the input 27. The clock signal generator 34 generates in the known manner a pulse train or sequence containing pulses 87 which appear in the control signal 12b shown in FIG. 6d. When the edges 4 and 5 of the binary or first signal 1 occur, the pulse generator 35 produces in the known manner the pulse train 9b containing pulses 10b and 11b of the length or duration 2T2, see FIG. 6c. This length or duration of the pulses 10b and 11b is preset by means of the delay stage 43 in the pulse generator 35, see FIG. 3. The control signal 12b is combined in the OR gate 30 from the pulse train or sequence 9b and the clock signal.

The amplifier 26 produces the pulsed or second signal 20b from this control signal 12b and the delayed signal 1b, as shown in FIG. 6e. During this operation, the delayed signal 1b controls the polarity of the pulses produced by the control signal 12b and forming the pulsed or second signal 20b. The pulsed or second signal 20b thus always contains an additional pulse 88 formed by two immediately consecutive pulses upon the occurrence of each edge or flank 4 and 5 of the binary or first signal 1. The delay unit 38 shown in FIG. 2 is required in order to produce a signal 20 as shown in FIG. 1f or a signal 20b as shown in FIG. 6e containing the additional pulse 22, 23 or 88 which is composed of the two immediately consecutive pulses 22 and 23 having opposite polarities, wherein the first pulse possesses the polarity of the preceding pulses and the second pulse the polarity of the following pulses. Delaying the binary or first signal 1 by the time period T2, results in the pulses 10b and 11b in the pulse train or sequence 9b. The length or duration of the pulses 10b and 11b permits accommodating the additional pulse 23, 23 or 88 composed of the two immediately consecutive pulses 22 and 23 of opposite polarities within such pulses 10b and 11b in the pulsed or second signal 20b.

While there are shown and described present preferred embodiments of the invention, it is to be distinctly understood that the invention is not limited thereto, but may be otherwise variously embodied and practiced within the scope of the following claims. Accordingly,

What we claim is:

1. A method for converting a binary signal composed of a sequence of sections assuming a first state and a second state, into a pulsed signal for recording purposes, comprising the steps of:

generating a first sequence of pulses having substantially equal spacings and a first polarity corresponding to the first state of the binary signal;

generating a second sequence of pulses having substantially equal spacings and a second polarity corresponding to the second state of the binary signal;

generating additional pulses at the transitions of said binary signal between said first state and said second state and having a polarity corresponding to the direction of said transitions between said first state and said second state of said binary signal; and combining said first sequence of pulses having said first polarity, said second sequence of pulses having said second polarity, and said additional pulses in order to form said pulsed signal containing (i) pulse pairs having different polarities and having a spacing which is substantially identical to said substantially equal spacings between said pulses having said first polarity and between said pulses having said second polarity; and (ii) further pulse pairs having different polarities and a shortened spacing as compared to said substantially equal spacing between said pulses having said first polarity and between said pulses having said second polarity and which further pulse pairs are indicative of a transition between said first and second polarities.

2. The method as defined in claim 1, wherein:

said step of generating said pulsed signal further entails the step of generating said pulse pairs and said further pulse pairs upon the occurrence of transitions between the first and second states of said binary signal.

3. The method as defined in claim 1, further including the steps of:

generating from said binary signal a sequence of pulses each of which occurs upon a transition between said first and second states of said binary signal;

generating a clock signal containing a sequence of substantially equally spaced clock pulses having a predetermined spacing which is substantially identical with said substantially equal spacings between said pulses having said first polarity and between said pulses having said second polarity;

combining said sequence of pulses and said sequence of clock pulses in order to thereby form a control signal;

generating a d.c. current signal; and said step of generating said pulsed signal entailing the step of modulating said d.c. current signal conjointly by said control signal and said binary signal.

4. The method as defined in claim 3, wherein:

during said step of combining said sequence of pulses which are generated from said binary signal upon a transition between said first and second states of said binary signal and said sequence of clock pulses in order to thereby form said control signal, forming said control signal at a predetermined polarity; and during said step of modulating said d.c. current supply signal conjointly by said control signal and said binary signal, changing said predetermined polarity of said control signal upon a transition between the first and second states of said binary signal.

5. The method as defined in claim 1, further including the steps of:

recording said pulsed signal on a magnetic record carrier; and during said step of recording said pulsed signal, magnetizing said magnetic record carrier using said first sequence of pulses having said first polarity and maintaining the thus affected magnetization until the occurrence of a first pulse of said second sequence of pulses having said second polarity.

6. The method as defined in claim 5, wherein:

said step of recording said pulsed signal on said magnetic record carrier entails recording said sequences of pulses constituting said pulsed signal in order to thereby store said binary signal on said magnetic record carrier.

7. The method as defined in claim 6, wherein:

during said step of recording said sequences of pulses constituting said pulsed signal, recording said sequences of pulses using a recording head which defines a recording zone having a predetermined length;

during said steps of generating from said binary signal said pulsed signal, generating said first sequence of pulses having said first polarity and said second sequence of pulses having said second polarity at a preselected spacing between said first sequence and said second sequence; and preselecting as said spacing, a spacing which corresponds to a length which is smaller than said predetermined length of said recording zone defined by said recording head.

8. A method for converting a first binary signal composed of a sequence of sections assuming a first state and a second state, into a second binary signal, comprising the steps of:

generating a first sequence of pulses having a first polarity during the time during which the first binary signal assumes the first state;

generating a second sequence of pulses having a second polarity during the time during which said first binary signal assumes the second state;

generating additional pulses at transition times at which said first binary signal changes over from the first state into the second state and from the second state into the first state; and combining said first sequence of pulses having said first polarity, said second sequence of pulses having said second polarity, and said additional pulses in order to thereby form said second binary signal in which said additional pulses are interspersed between said first sequence of pulses having said first polarity and said second sequence of pulses having said second polarity.

9. The method as defined in claim 8, wherein:

said steps of generating said first sequence of pulses and said second sequence of pulses entail generating said first sequence of pulses and said second sequence of pulses at substantially equal spacings within each one of said first sequence of pulses and said second sequence of pulses and also between adjacent pulses of said first sequence of pulses and said second sequence of pulses.

10. The method as defined in claim 9, wherein:

said step of combining said first sequence of pulses having said first polarity, said second sequence of pulses having said second polarity, and said additional pulses entails placing each one of said additional pulses at a reduced spacing relative to the adjacent pulses of said first sequence of pulses and said second sequence of pulses as compared with said substantially equal spacings within said first sequence of pulses and said second sequence of pulses.

11. The method as defined in claim 8, wherein:

said step of generating said additional pulses entails generating additional pulses of a polarity which corresponds to the state which the first binary signal assumes after the transition.

12. The method as defined in claim 8, wherein:

said step of generating said additional pulses entails generating double pulses composed of two immediately consecutive pulses of opposite polarity in a sequence corresponding to the direction of the respective state transition in said first binary signal.

* * * * *

UNITED STATES PATENT AND TRADEMARK OFFICE
CERTIFICATE OF CORRECTION

PATENT NO. : 4,847,702
DATED : July 11, 1989
INVENTOR(S) : JULIEN PIOT et al

It is certified that error appears in the above-identified patent and that said Letters Patent is hereby corrected as shown below:

Column 3, line 56, please delete "pulse" and insert --pulses--

Column 4, line 8, after "and" please insert -- which correspond to the edges 4 and 5 of the binary or first-- and after "of" please delete "the" and insert --these--

Column 4, line 9, please delete "pairs" and insert --pulses--

Column 4, line 11, please delete "pairs" and insert --pulses--

Column 7, line 15, please delete "delayd" and insert --delayed--

Column 7, line 63, please delete "or line" and insert --line or--

UNITED STATES PATENT AND TRADEMARK OFFICE
CERTIFICATE OF CORRECTION

PATENT NO. : 4,847,702

DATED : July 11, 1989

INVENTOR(S) : Julien Piot et al

It is certified that error appears in the above-identified patent and that said Letters Patent is hereby corrected as shown below:

Column 8, line 39, after "additional" please delete "pulse 23" and insert --pulses 22-- and after "23" please delete "or 88"

Signed and Sealed this

Twenty-second Day of May, 1990

Attest:

HARRY F. MANBECK, JR.

*Attesting Officer*   *Commissioner of Patents and Trademarks*